(12) United States Patent
Simon et al.

(10) Patent No.: US 12,553,754 B2
(45) Date of Patent: Feb. 17, 2026

(54) OMNIDIRECTIONAL FLOW SENSOR

(71) Applicant: The Trustees of Princeton University, Princeton, NJ (US)

(72) Inventors: Nathaniel Simon, Princeton, NJ (US); Alexander Piqué, Princeton, NJ (US); David Snyder, Princeton, NJ (US); Kyle Ikuma, Norwood, NJ (US); Anirudha Majumdar, Hillsborough, NJ (US); Marcus Hultmark, Princeton, NJ (US)

(73) Assignee: The Trustees of Princeton University, Princeton, NJ (US)

(*) Notice: Subject to any disclaimer, the term of this patent is extended or adjusted under 35 U.S.C. 154(b) by 350 days.

(21) Appl. No.: 18/367,015

(22) Filed: Sep. 12, 2023

(65) Prior Publication Data
US 2024/0200997 A1 Jun. 20, 2024

Related U.S. Application Data

(60) Provisional application No. 63/408,284, filed on Sep. 20, 2022, provisional application No. 63/405,731, filed on Sep. 12, 2022.

(51) Int. Cl.
*G01F 1/684* (2006.01)
*G01F 1/69* (2006.01)
*G01P 5/10* (2006.01)
*G01P 5/12* (2006.01)

(52) U.S. Cl.
CPC .............. *G01F 1/6845* (2013.01); *G01F 1/69* (2013.01); *G01P 5/10* (2013.01); *G01P 5/12* (2013.01)

(58) Field of Classification Search
CPC ........................... G01P 5/12; G01F 1/68–699
See application file for complete search history.

(56) References Cited

U.S. PATENT DOCUMENTS

| 5,880,366 A | * | 3/1999 | Yamaguchi | G01F 1/692 |
| | | | | 73/204.26 |
| 10,877,060 B2 | * | 12/2020 | Remboski | G01P 1/026 |
| 11,592,838 B2 | * | 2/2023 | Arwatz | G01P 5/10 |
| 2008/0034861 A1 | * | 2/2008 | Bognar | G01F 1/698 |
| | | | | 73/204.19 |

OTHER PUBLICATIONS

Craig, William et al., "Geometric Attitude and Position Control of a Quadrotor in Wind," Journal of Guidance, Control, and Dynamics, vol. 43, No. 5, pp. 870-883, May 2020.
(Continued)

*Primary Examiner* — Justin N Olamit
(74) *Attorney, Agent, or Firm* — Meagher Emanuel Laks Goldberg & Liao, LLP

(57) ABSTRACT

Disclosed is a fast-response sensor system to measure a fluid vector in a plurality of dimensions. This system, known as 'MAST' (for MEMS Anemometry Sensing Tower), utilizes microelectromechanical (MEMS) hot-wire devices to produce a solid-state, lightweight, and robust flow sensor system suitable for, e.g., real-time wind estimation onboard a UAV. The MAST uses three through eighteen polygonally-arranged microscale flow sensors to determine the fluid's vector's direction and magnitude.

24 Claims, 12 Drawing Sheets

(56) References Cited

OTHER PUBLICATIONS

Bailey, Sean C.C. et al., "Turbulence measurements using a nanoscale thermal anemometry probe," Journal of Fluid Mechanics, vol. 663, pp. 160-179, Sep. 1, 2010.

Fan, Y. et al., "Nanoscale sensing devices for turbulence measurements," Experiments in Fluids, vol. 56, No. 138, 13 pages, Jun. 20, 2015.

Huang, K.Y. et al., "Investigation of the atmospheric surface layer using a novel high-resolution sensor array," Experiments in Fluids, vol. 62, No. 76, 13 pages, Mar. 23, 2021.

Sundin, Johan et al., "A Soft Material Flow Sensor for Micro Air Vehicles," Soft Robotics, vol. 8, No. 2, pp. 119-127, 2021.

Zahran, Shady et al., "A New Velocity Meter Based on Hall Effect Sensors for UAV Indoor Navigation," IEEE Sensors Journal, vol. 19, No. 8, pp. 3067-3076, Apr. 15, 2019.

Tagliabue, Andrea et al., "Touch the Wind: Simultaneous Airflow, Drag and Interaction Sensing on a Multirotor," 2020 IEEE/RSJ International Conference on Intelligent Robots and Systems (IROS), pp. 1645-1652, Oct. 2020.

Yeo, Derrick W. et al., "Onboard Flow Sensing For Downwash Detection and Avoidance On Small Quadrotor Helicopters," Proceedings AIAA Guidance, Navigation and Control Conference, vol. AIAA 2015-1769, pp. 1-11, 2015.

Bruschi, P. et al., "Wind speed and direction detection by means of solid-state anemometers embedded on small quadcopters," Procedia Engineering, vol. 168, pp. 802-805, 2016.

Prudden, S. et al., "Measuring Wind with Small Unmanned Aircraft Systems," Journal of Wind Engineering and Industrial Aerodynamics, vol. 176, pp. 197-210, 2018.

Prudden, S. et al., "An Anemometer for UAS-based Atmospheric Wind Measurements," Proceedings of the 17th Australian International Aerospace Congress: AIAC, 7 pages, Feb. 2017.

Fu, M.K. et al., "Elastic filament velocimetry (EFV)," Measurement Science and Technology, vol. 28, No. 025301, 12 pages, Dec. 20, 2016.

Panerati, Jacopo et al., "Learning to Fly—a Gym Environment with PyBullet Physics for Reinforcement Learning of Multi-agent Quadcopter Control," 2021 IEEE/RSJ International Conference on Intelligent Robots and Systems (IROS), pp. 7512-7519, 2021.

\* cited by examiner

OMNIDIRECTIONAL FLOW SENSOR

CROSS-REFERENCE TO RELATED APPLICATIONS

This present application claims priority to U.S. Provisional Patent Application Nos. 63/405,731, filed Sep. 12, 2022, and 63/408,284, filed Sep. 20, 2022, the contents of each of which are incorporated by reference herein in its entirety.

STATEMENT REGARDING FEDERALLY SPONSORED RESEARCH OR DEVELOPMENT

This invention was made with government support under Grant No. FA9550-22-1-0020 awarded by the Air Force Office of Scientific Research (AFOSR). The government has certain rights in the invention.

TECHNICAL FIELD

The present disclosure is drawn to flow sensors, and specifically to fast-response sensor systems, e.g., for unmanned aerial vehicles (UAVs) to measure wind speeds.

BRIEF SUMMARY

In various aspects, an omnidirectional flow sensor may be provided. The flow sensor may include a plurality of microelectromechanical system (MEMS) flow sensors. Each MEMS flow sensor may include a substrate and at least one wire array. The substrate may have a first surface and a second surface opposite the first surface. The substrate may include a window (or "opening") extending through a portion of the first surface to the second surface. The at least one wire array may be disposed on the first surface. Each wire array may include an odd number of wires aligned in parallel directions and connected in series. One of the wire arrays may be disposed at least partially over the window (e.g., the odd number of wires may be disposed across the opening). Each MEMS flow sensor of the plurality of MEMS flow sensors may be coupled to a support substrate at a fixed distance from the chassis substrate. Each MEMS flow sensor may face a different direction. The flow sensor may include a chassis substrate. An additional MEMS flow sensors may be placed upon the chassis substrate.

The sensor may include at least one spacer configured to be coupled between the chassis substrate and the support substrates. In some embodiments, the support substrates may be arranged in a three-dimensional geometric shape (such as a polyhedron, such as a platonic solid), the three-dimensional geometric shape being disposed at an end of the at least one spacer. In some embodiments, each support substrate may be coupled orthogonal to the chassis substrate, and each support substrate may have one of the plurality of MEMS flow sensors placed on the support substrate at a fixed distance from the chassis substrate facing away from other support substrates.

The plurality of MEMS flow sensors may operate as a hotwire anemometer. The at least one wire array may be part of a Wheatstone bridge.

The at least one wire array may include four wire arrays configured as legs of a Wheatstone bridge. The four wire arrays may include a wire array on the first surface operably coupling a first contact and a second contact (e.g., a "first" wire array). The four wire arrays may include a wire array on the first surface operably coupling the second contact and a third contact (e.g., a "second" wire array). The four wire arrays may include a wire array on the first surface operably coupled the third contact and a fourth contact (e.g., a "third" wire array). The four wire arrays may include a wire array configured to extend over the window, and operably coupled the fourth contact and the first contact (e.g., a "fourth" wire array).

Each contact may be composed of platinum. Each wire array may be composed of platinum. The substrate may be a silicon substrate electrically insulated with a layer of silicon nitride or silicon oxide. The chassis substrate and each support substrate may include a printed circuit board (PCB). In some embodiments, there may be at least 5 support substrates.

The omnidirectional flow sensor may include an instrument amplifier on each support substrate, configured to amplify a signal from each MEMS flow sensor for greater resolution. The omnidirectional flow sensor may include a constant voltage source on the chassis substrate that is coupled to each MEMS flow sensor. Each support substrate may have one MEMS flow sensor bonded to the support substrate with a conductive epoxy. Each support substrate may have one MEMS flow sensor bonded to the support substrate with solder. Each support substrate may have one MEMS flow sensor bonded to the support substrate with gold.

In various aspects, a system may be provided. The system may include at least one processor and an omnidirectional flow sensor as disclosed herein operably coupled to the at least one processor. The system may include a vehicle (such as an unmanned aerial vehicle (UAV)). The omnidirectional flow sensor may be operably coupled to the vehicle.

The at least one processor may be coupled to a non-transitory computer-readable storage device containing instructions that, when executed by the at least one processor, causes the at least one processor to, collectively perform certain steps. The steps may include causing a constant voltage to be applied across a Wheatstone bridge of the omnidirectional flow sensor. The steps may include receiving signals from each MEMS flow sensor in the omnidirectional flow sensor. The steps may include determining a wind angle by passing the received signals to a first trained machine learning algorithm. The steps may include determining a wind magnitude by passing the received signals to a second trained machine learning algorithm. The steps may include outputting the determined wind angle and/or wind magnitude. The steps may include adjusting a rotor speed or a control surface based on the determined wind angle and/or wind magnitude.

The first trained machine learning algorithm may include an input layer and two hidden layers. The two hidden layers may include a first hidden layer and a second hidden layer. The input layer may have a width of n, where n is a number of MEMS flow sensor in the system. The first hidden layer may be of width 8n. The second hidden layer may be of width 4n+5.

The second trained machine learning algorithm may include an input layer, a hidden layer, and an output layer, the input layer having a width of 3, the hidden layer having a width of 6, and the output layer having a width of 1.

BRIEF DESCRIPTION OF DRAWINGS

The accompanying drawings, which are incorporated in and constitute a part of this specification, illustrate embodiments of the present invention and, together with a general description of the invention given above, and the detailed description of the embodiments given below, serve to explain the principles of the present invention.

Figure 1:
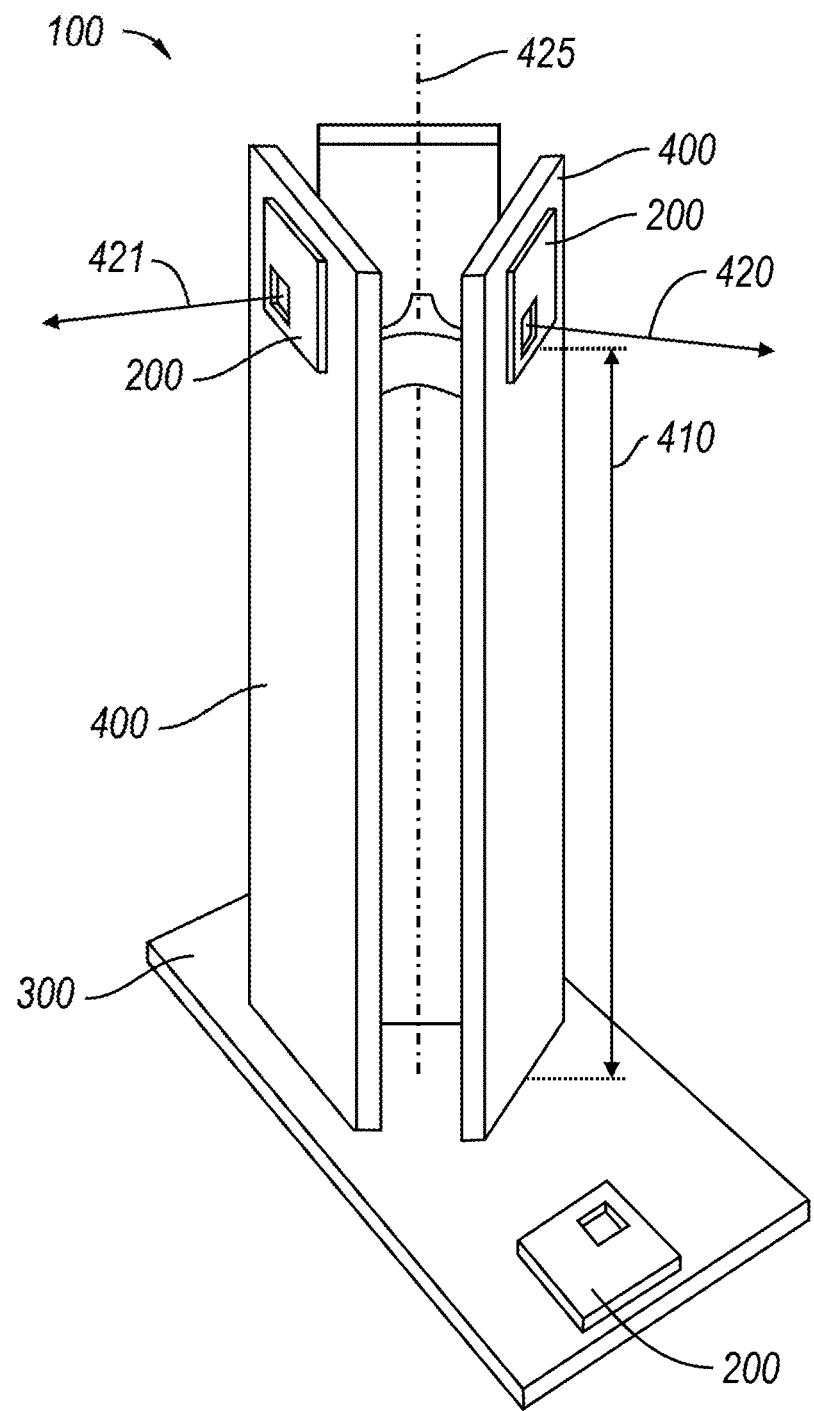
FIG. 1 is an illustration of an embodiment of an omnidirectional flow sensor.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

The following description and drawings merely illustrate the principles of the invention. It will thus be appreciated that those skilled in the art will be able to devise various arrangements that, although not explicitly described or shown herein, embody the principles of the invention and are included within its scope. Furthermore, all examples recited herein are principally intended expressly to be only for illustrative purposes to aid the reader in understanding the principles of the invention and the concepts contributed by the inventor(s) to furthering the art and are to be construed as being without limitation to such specifically recited examples and conditions. Additionally, the term, "or," as used herein, refers to a non-exclusive or, unless otherwise indicated (e.g., "or else" or "or in the alternative"). Also, the various embodiments described herein are not necessarily mutually exclusive, as some embodiments can be combined with one or more other embodiments to form new embodiments.

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily limit any of the various claimed inventions. Moreover, some statements may apply to some inventive features but not to others. Those skilled in the art and informed by the teachings herein will realize that the invention is also applicable to various other technical areas or embodiments.

Due to limitations in available sensor technology, unmanned aerial vehicles (UAVs) lack an active sensing capability to measure turbulence, gusts, or other unsteady aerodynamic phenomena. Conventional in situ anemometry techniques fail to deliver in the harsh and dynamic multi-rotor environment due to form factor, resolution, or robustness requirements.

To address this capability gap, disclosed herein is a fast-response sensor system to measure a wind vector in two dimensions. This system, known as 'MAST' (for MEMS Anemometry Sensing Tower), leverages advances in microelectromechanical (MEMS) hot-wire devices to produce a solid-state, lightweight, and robust flow sensor suitable for real-time wind estimation onboard a UAV. The MAST may use, e.g., five pentagonally- or six hexagonally-arranged microscale hotwires (MEMS flow sensors) to determine the wind vector's direction and magnitude. In another embodiment, the MAST uses polygonally-arranged or polyhedronally-arranged MEMS flow sensors, where the polygon or polyhedron has between 3 and 18 sides.

In various aspects, an omnidirectional flow sensor may be provided. Referring to FIG. 1, an omnidirectional flow sensor 100 may include a plurality of microelectromechanical system (MEMS) flow sensors 200.

Figure 2:
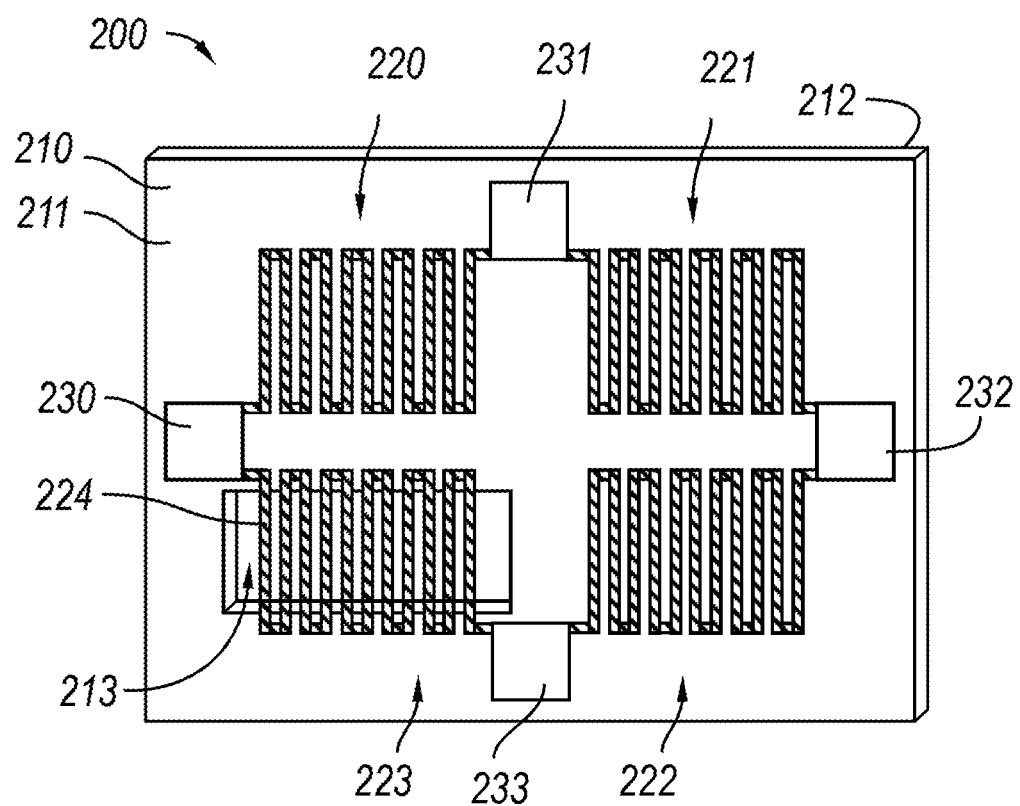
FIG. 2 is an illustration of a MEMS flow sensor.

Referring to FIG. 2, each MEMS flow sensor 200 may include a substrate 210 and at least one wire array 220. The substrate may have a first surface 211 and a second surface 212 opposite the first surface. The substrate may include a window 213 (or "opening") extending through a portion of the first surface to the second surface. The opening may have any cross-sectional shape, although a preferred embodiment utilizes a substantially rectangular cross-sectional shape. The opening may be configured to allow a fluid to be measured to pass through the opening.

The substrate may have a rectangular shape.

The substrate may have a length and width dimension, each of which may be 10 mm or less. The length and width dimensions may each be 8 mm or less. The length and width dimensions may each be 6 mm or less. The length and width dimensions may each be 5 mm or less. The length and width dimensions may each be at least 1 mm. The length and width dimensions may each be at least 2 mm. The length and width dimensions may each be at least 3 mm. The substrate may have a thickness of less than 2 mm. The substrate may have a thickness of less than 1 mm. The substrate may have a thickness of less than 0.75 mm. The substrate may have a thickness of at least 0.1 mm. The substrate may have a thickness of at least 0.25 mm. The substrate may have a thickness of at least 0.5 mm.

The substrate may be a non-conducting, stiff material (such as silicon, silica, fiberglass, epoxy, etc.) or a flexible material (such as a polydimethylsiloxane (PDMS) or a polyimide). In some embodiments, the substrate may include silicon. In some embodiments, the substrate may include silica. In some embodiments, the substrate may include fiberglass. In some embodiments, the substrate may include an epoxy. In some embodiments, the substrate may include a polydimethylsiloxane (PDMS). In some embodiments, substrate may include a polyimide. In some embodiments, the substrate may be a silicon substrate electrically insulated with a layer of silicon nitride or silicon oxide.

The at least one wire array 220, 221, 222, 223 may be disposed on the first surface 211. Each wire array may include an odd number of wires 224 aligned in parallel directions and connected in series. In some embodiments, the number of wires n is greater than 4. In some embodiments, $n \geq 5$. In some embodiments, $n \geq 7$. In some embodiments, $n \geq 9$. In some embodiments, $n \geq 11$. In some embodiments, $n \leq 17$. In some embodiments, $n \leq 15$. In some embodiments, $n \leq 13$. Each wire in the wire array may be parallel to the first surface 211.

The composition of each wire may be any electrically conductive material. In some embodiments, at least one of the wires may include a pure metal or a metal alloy, an electrically conductive polymer, a semiconductor material or a piezoresistive material, or a combination thereof. In some embodiments, at least one wire may include two or more materials. In some embodiments, each wire may be comprised of or consists of platinum, titanium, or a nickel-chrome alloy. In some embodiments, each wire may be platinum. In some embodiments, each wire, independently, may be coated or treated to prevent the electrically conductive material from interacting with the fluid. In some embodiments, each wire, independently, may be coated with a non-conductive material. In some embodiments, the non-conductive material is a parylene.

In some embodiments, one of the wire arrays may be disposed at least partially over the window 213 (e.g., each of the odd number of wires may be at least partially disposed across the opening).

Each wire array may be disposed between connection pads 230, 231, 232, 233. The connection pads may be any electrically conductive material, as disclosed herein, and may be the same or different from the electrically conductive material forming any or all wires. For example, in some embodiments, each contact pad may be platinum.

The at least one wire array may be part of a Wheatstone bridge. That is, in some embodiments, the wire arrays and pads may be arranged as a Wheatstone bridge. In one example, the MEMS flow sensor is a 4.2×3.3×0.66 mm silicon substrate with four wire arrays arranged as legs of a Wheatstone bridge, as depicted in FIG. 2. Each wire array is comprised of a platinum ribbon, with a cross section of 10×0.1 µm, doubled back multiple times such that each array consists of eleven parallel platinum ribbons. The platinum is deposited onto a silicon substrate, which is electrically insulated by a thin layer of silicon nitride. The resulting wire arrays act as temperature-sensitive resistors in the Wheatstone bridge. A constant voltage may be supplied to the top of the bridge, generating heat via Joule heating in all four legs. Like a typical hot-wire, the sensing mode of the MEMS flow sensor depends on a relative difference in convective cooling (due to the flow) between one leg and the others. In this case, the Bottom-Left wire array (wire array 223 as depicted in FIG. 2) are made freestanding using silicon wet etch techniques. This results in a rectangular opening in the silicon through which the air flows, exposing the freestanding array to convective cooling from the air. The difference in temperature and thus resistance between the freestanding wire array and the three embedded wire arrays creates a voltage difference across the Left (L) and Right I contact pads (e.g., in FIG. 2, first contact pad 230 and third contact pad 232, respectively) which is measured as the signal of MEMS flow sensor.

The equation for the resulting signal can be derived from Kirchhoff's circuit laws:

$$V_L - V_R = \left( \frac{R_x}{R_x + R_1} - \frac{R_3}{R_2 + R_3} \right) V_T \quad \text{(Eq.)}$$

At zero velocity, $V_L - V_R > 0$, since $R_x > R_{1,2,3}$, as the three embedded arrays are being cooled through conduction to the silicon. Assuming that the temperature of the silicon heat sink (and thus the embedded resistors) remains constant and equal to the ambient temperature, as flow velocity increases and Ry cools and drops, the difference $R_x - R_{1,2,3}$ decreases and thus the signal $V_L - V_R$ decreases. This indicates the existence of an upper limit in measurable velocity (as $R_x - R_{1,2,3} \to 0$), which depends on the voltage applied to the bridge.

In FIG. 2, the Wheatstone bridge is formed with resistance $R_1$ being that of leg 1 (formed from first connection pad 230, first wire array 220, and second connection pad 231), $R_2$ being that of leg 2 (formed from second connection pad 231, second wire array 221, and third connection pad 232), $R_3$ being that of leg 3 (formed from third connection pad 232, third wire array 222, and fourth connection pad 233), and $R_x$ being that of leg 4 (formed from the fourth connection pad 233, fourth wire array 223 over window 213, and first connection pad 230). Convection causes $R_x$ to differ in temperature (and thus resistance) from $R_1$, $R_2$, $R_3$, which is measured as a voltage difference across the first and third connection pads 230, 232.

In some embodiments, each MEMS flow sensor is configured such that the first surface 211 faces a support substrate (and the second surface 212 faces away from the support substrate). In this way, the wire arrays are disposed between the support substrate and the MEMS flow sensor substrate.

In some embodiments, each MEMS flow sensor is configured such that the second surface 212 faces the support substrate (and the first surface 211 faces away from the support substrate). In this way, the MEMS flow sensor substrate is disposed between the wire arrays and the support substrate.

Referring to FIG. 1, the flow sensor may include a chassis substrate 300. One of the MEMS flow sensors may be placed upon the chassis substrate.

The chassis substrate may be a non-conducting, stiff material (such as silicon, silica, fiberglass, epoxy, etc.) or a flexible material (such as a polydimethylsiloxane (PDMS) or a polyimide). In some embodiments, the chassis substrate may include silicon. In some embodiments, the chassis substrate may include silica. In some embodiments, the chassis substrate may include fiberglass. In some embodiments, the chassis substrate may include an epoxy. In some embodiments, the chassis substrate may include a polydimethylsiloxane (PDMS). In some embodiments, chassis substrate may include a polyimide. In some embodiments, the chassis substrate may be a silicon substrate electrically insulated with a layer of silicon nitride or silicon oxide. The chassis substrate may include a printed circuit board (PCB).

Each MEMS flow sensor of the plurality of MEMS flow sensors may be coupled to a support substrate at a fixed distance from the chassis substrate. Each MEMS flow sensor may face a different direction.

In some embodiments, the support substrates may be arranged in a three-dimensional geometric shape (such as a polyhedron, such as a platonic solid), the three-dimensional geometric shape being disposed at an end of the at least one spacer. See FIG. 18.

In some embodiments, the flow sensor may include three or more support substrates 400. In some embodiments, each support substrate may be coupled orthogonally to the chassis substrate. In some embodiments, there may be at least 5 support substrates. In some embodiments, there may be at least 6 support substrates. In some embodiments, there may be 3-18 support substrates. In some embodiments, there may be no more than 8 support substrates. In some embodiments, there may be no more than 10 support substrates. In some embodiments, there may be no more than 18 support substrates.

Each support substrate may have one of the plurality of MEMS flow sensors placed on the support substrate at a fixed distance 410 from the chassis substrate 300. Each support substrate may have one MEMS flow sensor bonded to the support substrate with a conductive epoxy. Each support substrate may have one MEMS flow sensor bonded to the support substrate with solder. Each support substrate may have one MEMS flow sensor bonded to the support substrate with gold.

Each MEMS flow sensor, disposed on a surface of the support substrate, may be configured to face away from other support substrates (i.e., a direction 420 normal to the first or second surface of the MEMS flow sensor substrate is oriented in a direction that does not intersect any support substrate, such as in a direction away from a centrally-located line 425 orthogonal to the chassis substrate, between all of the support substrates.) In some embodiments, each MEMS flow sensor is configured to face a direction 420 that is different from the directions (e.g., direction 421) that every MEMS flow sensor on every other support substrate faces.

Each support substrate may be a non-conducting, stiff material (such as silicon, silica, fiberglass, epoxy, etc.) or a flexible material (such as a polydimethylsiloxane (PDMS) or a polyimide). In some embodiments, each support substrate may include silicon. In some embodiments, each support substrate may include silica. In some embodiments, each support substrate may include fiberglass. In some embodiments, each support substrate may include an epoxy. In some embodiments, each support substrate may include a polydimethylsiloxane (PDMS). In some embodiments, each support may include a polyimide. In some embodiments, each support substrate may be a silicon substrate electrically insulated with a layer of silicon nitride or silicon oxide. Each support substrate may include a printed circuit board (PCB).

Figure 3:
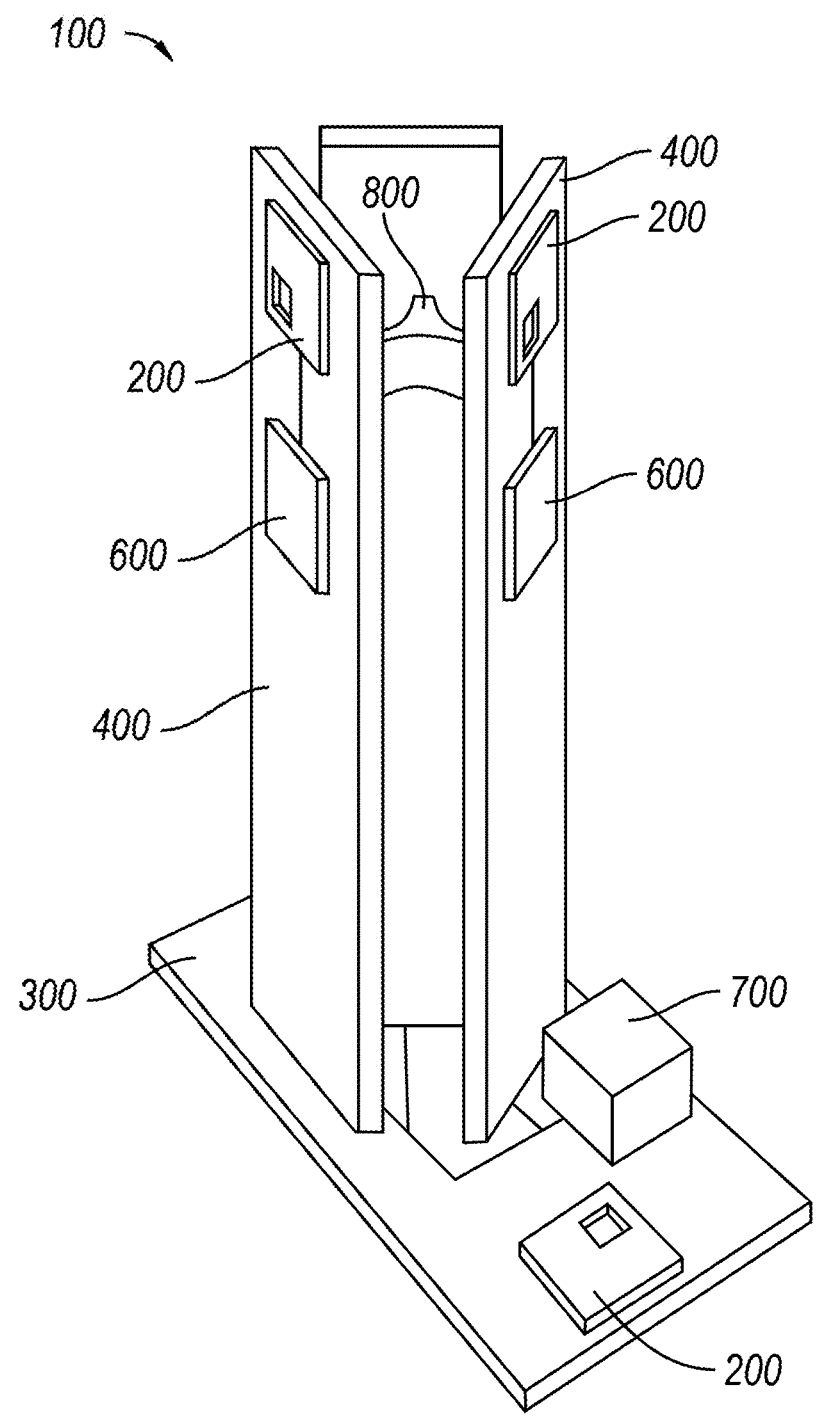
FIG. 3 is an illustration of an alternate embodiment of an omnidirectional flow sensor.

Referring to FIG. 3, the omnidirectional flow sensor may include an instrument amplifier 600 on each support substrate. Each instrument amplifier may be configured to amplify a signal from each MEMS flow sensor for greater resolution.

The plurality of MEMS flow sensors may operate as a hotwire anemometer. In some embodiments, the omnidirectional flow sensor may include a voltage source 700 on the chassis substrate that is coupled to each support substrate. The voltage source may be a constant voltage source. In this manner, the omnidirectional flow sensor may be configured to operate as a constant voltage hotwire anemometer. Conversely, if the voltage source is a constant current voltage source, the omnidirectional flow sensor may be configured to operate as a constant current hotwire anemometer.

Figure 4:
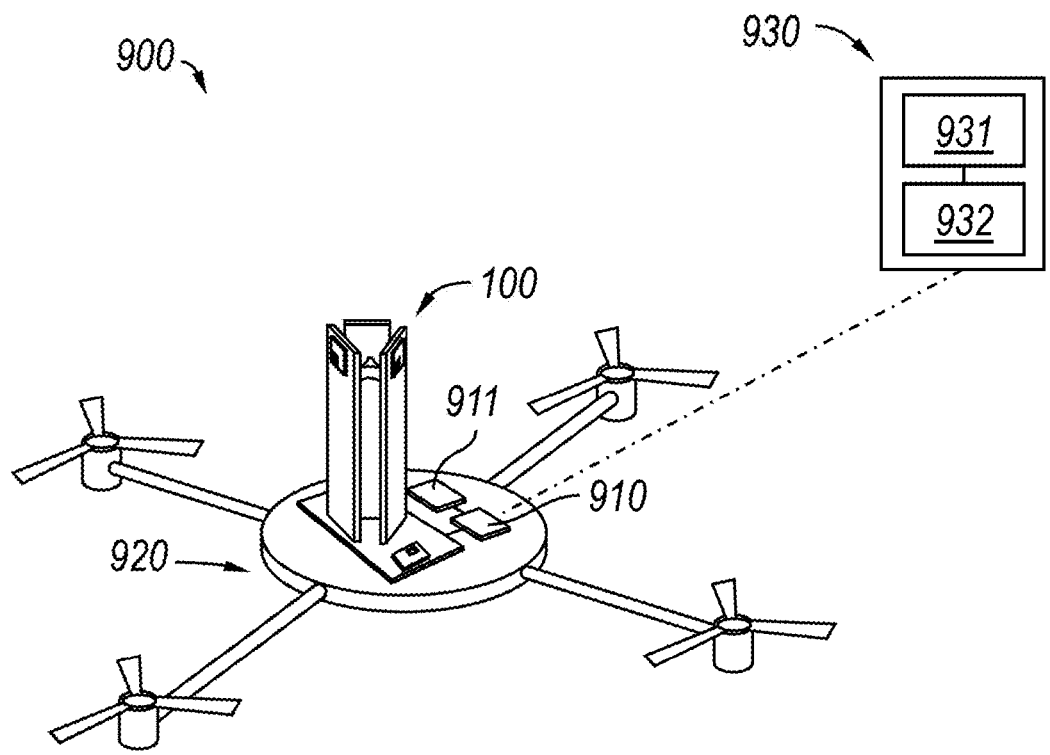
FIG. 4 is an illustration of an embodiment of a system.

In various aspects, a system may be provided. Referring to FIG. 4, a system 900 may include at least one processor 910 and an omnidirectional flow sensor 100 as disclosed herein operably coupled to the at least one processor. The at least one processor may be operably coupled to a non-transitory computer-readable storage device 911 that may contain instructions that, when executed, cause the at least one processor to perform certain steps. The system may include a vehicle 920 (such as an unmanned aerial vehicle (UAV)). The omnidirectional flow sensor may be operably coupled to the vehicle.

In some embodiments, at least one of the one or more processors may be operably coupled to the vehicle. In some embodiments, a first processor onboard the vehicle may communicate with a second processor 931 (of the one or more processors), which may be on a remote server 930. The remote processor may be operably coupled to a non-transitory computer-readable storage device 932 that may contain instructions that, when executed, cause the at least one processor to perform certain steps. When processors are located remotely from each other, they may collectively perform certain functions.

The at least one processor may be coupled to a non-transitory computer-readable storage device containing instructions that, when executed by the at least one processor, causes the at least one processor to, collectively, perform certain steps. The steps may include causing a constant voltage to be applied across a Wheatstone bridge of the omnidirectional flow sensor. The steps may include receiving signals from each MEMS flow sensor in the omnidirectional flow sensor. The steps may include determining a wind angle by passing the received signals to a first trained machine learning algorithm. The steps may include determining a wind magnitude by passing the received signals to a second trained machine learning algorithm. The steps may include outputting the determined wind angle and/or wind magnitude. The steps may include adjusting a rotor speed or a control surface (such as an aileron), based on the determined wind angle and/or wind magnitude.

The first trained machine learning algorithm may include an input layer and two hidden layers. The two hidden layers may include a first hidden layer and a second hidden layer. The input layer may have a width of n, where n is a number of MEMS flow sensor in the system. The first hidden layer may be of width 8n. The second hidden layer may be of width 4n+5.

The second trained machine learning algorithm may include an input layer, a hidden layer, and an output layer, the input layer having a width of 3, the hidden layer having a width of 6, and the output layer having a width of 1.

Example 1

As disclosed herein, there are two main components to Example 1's MAST: the support-PCB (printed circuit board), on which a single MEMS Hotwire is placed, and a chassis-PCB, on which several support-PCBs are mounted orthogonally. The support-PCB serves to place and orient an individual MEMS flow sensor in the desired location and orientation. A Tresky Flip Chip Bonder is used to bond the MEMS flow sensor to the support-PCB with silver epoxy. Once bonded, the fragile sensing element (freestanding platinum wires) is protected between the PCB and the silicon substrate, improving the robustness of the design. An instrument amplifier (AD623) on each support-PCB amplifies the signal for greater resolution.

The chassis-PCB provides a high-precision constant 10 V source via an AD587 to each of the support-PCBs. The support-PCBs are connected orthogonally to the chassis-PCB via right-angle header connectors. The location of header pins on the chassis—PCB determines the number and orientations of support-PCBs.

Since it is intuitive that increasing the number of sensors will monotonically improve performance, a self-imposed design constraint of this example was to determine the fewest number of MEMS flow sensors needed to resolve the wind vector to a predetermined accuracy for use with UAVs.

Due to the MAST's modular architecture, rapid iteration and testing of multiple regular polygon MAST designs was possible, including triangular (3 supports), square (4 supports), pentagonal (5 supports) and hexagonal (6 supports). The MEMS flow sensor and various MAST designs were characterized through wind tunnel and frequency response testing.

Figure 6:
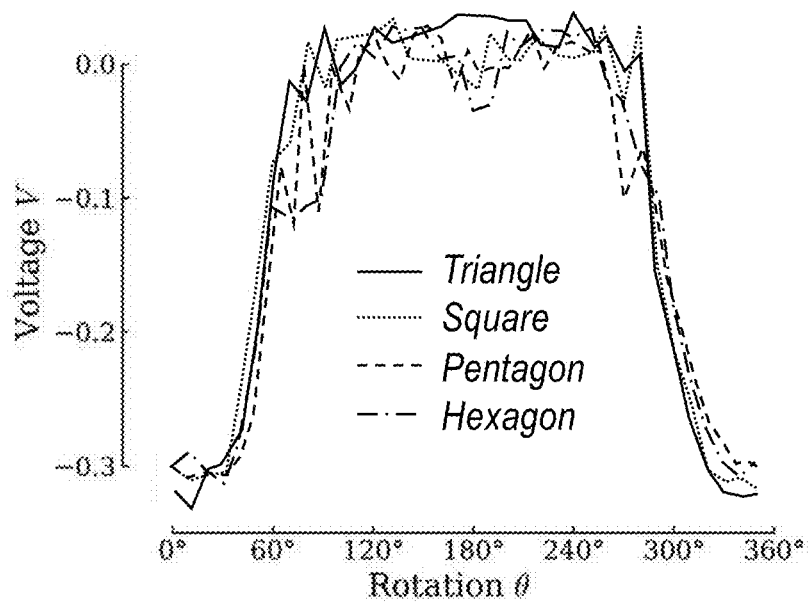
FIG. 6 is a graph of voltage V vs. MAST rotation $\theta$ for $U_\infty=4.9$ m/s, showing angular response of A2, the support-PCB perpendicular to the flow at 0° for each MAST geometry.
Figure 7:
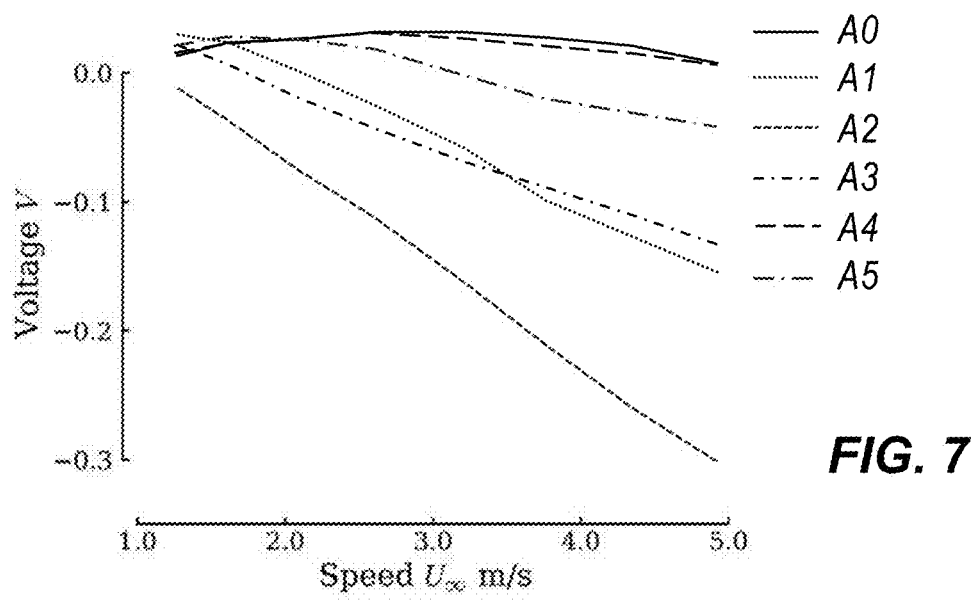
FIG. 7 is a graph of voltage vs. speed at $\theta=0°$. Note that A2 (facing into flow) has the lowest signal. Pairs A1,A3 and A0,A4 are symmetric as expected. A5 faces the wake.
Figure 8:
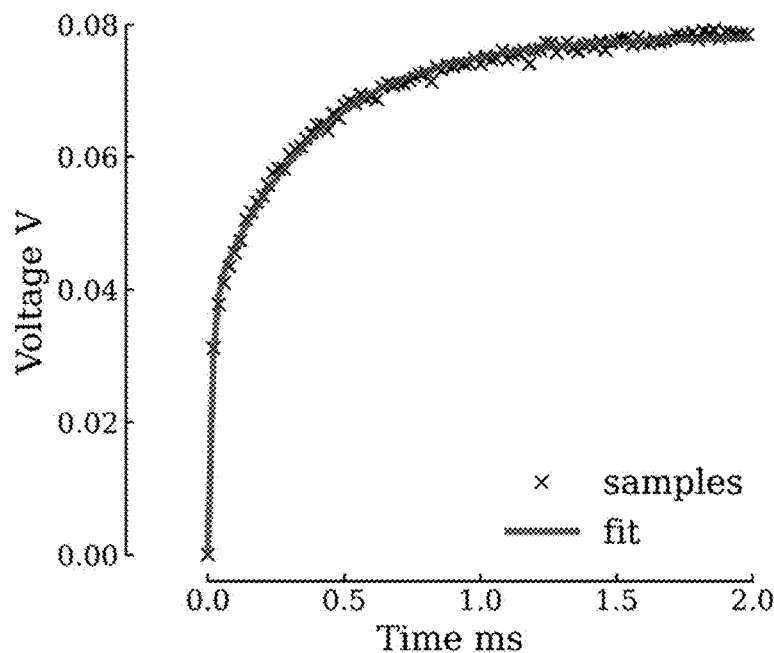
FIG. 8 is a graph showing phase-averaged sensor response (x-marks) to a 0.1V square wave input over 300 trials. The solid line is the best-fit transfer function.

Two experimental studies were conducted. First, the MAST's response to wind speed was evaluated in a wind tunnel. To measure how the MAST responded to a change in wind direction, the MAST was mounted on a Velmex B4800TS Rotary Table. The MAST and rotary table were placed in an open-return wind tunnel measuring 1.2×0.6 m in cross section. A Pitot tube provided a velocity reference. For data acquisition, an NI™ Data Acquisition (DAQ) device (PCI-6341) was used. For all data presented here, measurements taken with no flow are subtracted from the raw voltage data to appropriately zero the non-zero velocity measurements. In addition, the data presented here has been compensated for a gain of 5 from the instrumentation amplifier located on the support-PCB. In other words, the voltages plotted in FIGS. 6-8 are pre-amplification.

Figure 5:
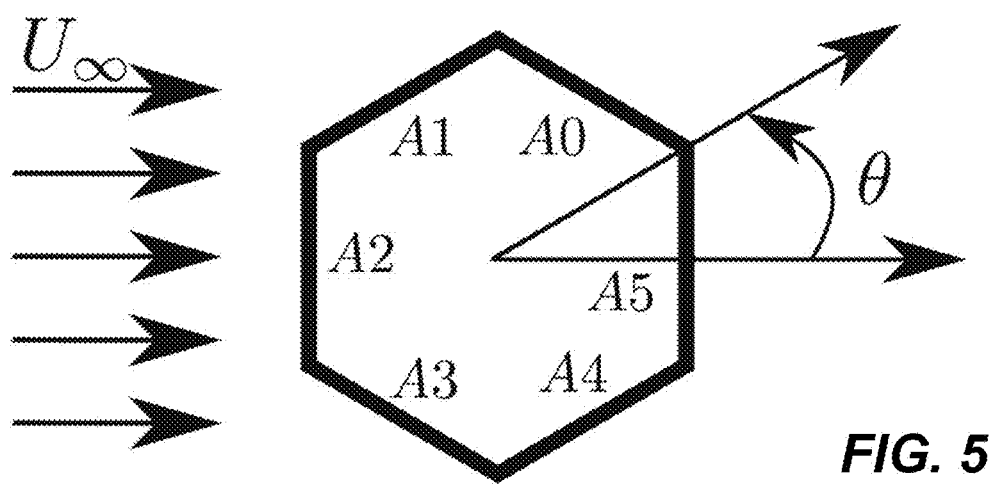
FIG. 5 is a schematic showing labeling of MEMS sensors on the hexagon MAST and MAST orientation with respect to the freestream velocity, $U_\infty$. Positive $\theta$ represents a counterclockwise rotation from the horizontal axis.

To evaluate the MAST's sensitivity to wind magnitude, eight different freestream velocities, 1.3 m/s≤U∞≤5.0 m/s, were tested. At each velocity, the MAST's sensitivity to angle was evaluated by rotating the MAST from 0°≤θ≤358°, in 2° increments. The orientation of the MAST with respect to the incoming flow can be found in FIG. 5. For each velocity and angle combination, data was sampled at 1 KHz for 30 seconds. A ten second pause between angle changes and a 60 second pause between speed changes were employed to ensure transient effects had dissipated before data collection. This process was repeated for the four different polygon MASTs (3-, 4-, 5-, and 6-support MASTs, as described above).

Second, the temporal response of an individual MEMS Hotwire was evaluated using a square-wave test; this technique is commonly used to measure the temporal resolution of conventional hot-wires. This common method of measuring a hot-wire's temporal resolution is to determine the sensor's response to a square wave input. Since the MEMS Hotwire sensor has the same operating principle as a hot-wire, the same test was used. In the square wave test, a single support-PCB was subjected to a 10 V offset+0.1 V square wave step input at 10 Hz. These parameters were chosen as 10 V is the normal operational voltage of the MEMS Hotwire, and a 0.1 V step input produced a response on the order of a typical velocity change. The step input was applied to the top of the MEMS Hotwire Wheatstone bridge by a Tektronix AFG3000C Arbitrary/Function Generator. The output signal was sampled by the NI™ DAQ at 50 KHz. A total sampling duration of 30 seconds yielded 300 periods which were phase-averaged.

Angle and speed calibration of the MAST. The wind tunnel experiments yielded calibration data for each MAST configuration across eight velocities up to 5 m/s and orientation range of 0°≤θ≤358°, in 2° increments. For a given speed and orientation, each MEMS flow sensor has a unique voltage response. For example, in FIG. 6, as the MAST rotates counterclockwise from θ=0°, (the orientation at which the A2 sensor is perpendicular to the flow), the MEMS flow sensor rotates out of the flow and thus the voltage climbs due to reduced convection. In the range of approximately 90°<θ<270°, the sensor is in the wake of the MAST and has a signal that is independent of angle. For θ>270°, the sensor is rotating back into the flow, and therefore, the voltage decreases to reflect the enhanced convection. Finally, the sensor's voltage returns to its original value once it is again perpendicular to the flow. A key observation from FIG. 6 is that a single support-PCB's angular sensitivity is independent of the greater MAST geometry. A minor exception is the region of 60°<θ<100°. The shape of the MAST instead determines the phase offset between adjacent sensors. For example, a hexagon MAST (consisting of six MEMS flow sensors) produces six curves each offset by 60°. The agreement of the six MEMS flow sensors responses can be observed by subtracting the geometric offset of each support-PCB to align with A0. This results in near-perfect agreement. This collapse occurs at all speeds and illustrates the consistency of the MEMs flow sensor. In addition, the measurements are highly repeatable: in a hysteresis sweep (from 0°→180°→0° in 0.5° increments and at multiple speeds), no hysteresis was detected. FIG. 7 shows the average hexagon MAST responses as a function of wind tunnel speed at a particular angle (θ=0°). From the data, it is evident that that the MEMS Hotwire perpendicular to the flow at θ=0° (A2) is both the most sensitive and has the highest signal to noise ratio. The sensor's response when perpendicular to the flow is similar to the performance of a conventional hot-wire, though it does not follow a power law.

Regarding the self-imposed design constraint discussed previously, the fewest number of sensors a MAST geometry needs to resolve a planar flow will be determined. A heuristic can be constructed from various plots to predict the number of sensors required. Each MEMS flow sensor is more sensitive to orientation at certain angles; in these 'sensitive regions' noise is minimized and slope is maximized. This region occurs when the sensor is between the perpendicular and wake orientations. In FIG. 6, this is roughly 40-60° and 270-320°, forming a 70° region. Dividing the total domain (360°) by the sensitive region (70°) yields 5.14, which implies that five or six sensors is the fewest number of sensors whose sensitive regions cover the entire 360° domain and provide a high degree of accuracy.

Frequency response. Finally, the temporal response of the sensor was determined by fitting a transfer function to the phase-averaged step response. The MEMS flow sensor response is shown in FIG. 8. A nondimensionalized step input and sensor response were generated. There was no measurable lag between the input and the start of the sensor's response. An overdamped transfer function of two real supports and one zero was fit to the first 100 points, or 2 ms. These points and the 94% fit are shown in FIG. 8. The fit transfer function is:

$$G(s) = \frac{2.724 \times 10^4 s + 1.412 \times 10^8}{s^2 + 7.276 \times 10^4 s + 1.8 \times 10^8}. \quad \text{(Eq. 2)}$$

This can be rewritten (through inverse Laplace transform) as two first-order systems in series. In particular:

$$V(t) = 0.782271 - 0.373107 \exp(-\omega_1 t -) - 0.409164 \exp(-\omega_2 t), \quad (3)$$

where the two supports are $\omega_1 = 70.2$ krad/sec and $\omega_2 = 2.57$ krad/sec.

Figure 9:
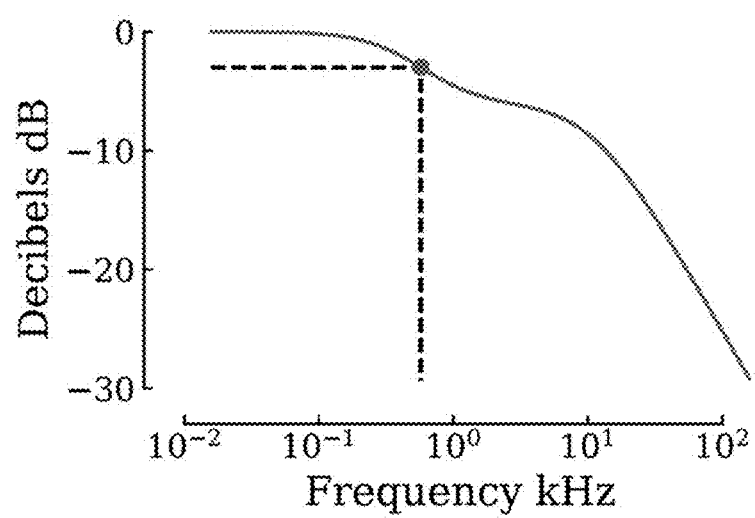
FIG. 9 is a Bode plot, where the solid line is the frequency response of the sensor, as determined from the transfer function divided by the DC gain, and the dashed line and solid point show the −3 dB bandwidth point, which occurs at 570 Hz.

The rise time of the transfer function is 0.640 ms and its −3 dB bandwidth is 570 Hz, as shown by the Bode plot in FIG. 9. A sensing bandwidth of 570 Hz is sufficiently high for the gust mitigation control problem, as well as for most UAV flow sensing campaigns.

To determine flow direction at a static, known speed it would be straightforward to fit a function (e.g., polynomial) to the sensitive regions described above. Onboard the UAV, however, flow speed and direction are both unknown and changing. Furthermore, FIG. 7 illustrates how angular sensitivity varies with speed; the curves at lower speeds are shaped differently than those at high speeds. Therefore, multiple MEMS flow sensor signals must be input simultaneously into a model that treats both flow speed and direction as unknowns.

This model (the functional relationship between the raw signals and the estimated wind vector) may be described below.

To effectively use the sensor to improve the drone controller, it is necessary to determine a functional relationship between the raw analog outputs of the sensor and the direction and magnitude of the true wind vector; these real-time estimates of the wind vector could then be logged or used by the control architecture depending on the application. As this nonlinear and complex mapping will be stationary across time, a reasonable approach is to learn the sensor-to-wind functional relationship by training a neural network using the wind tunnel data gathered in above. This method allows for a quantitative performance comparison of the MAST geometries, as well as an analysis of the effectiveness of various filtering techniques. Based on the mission requirements for the UAV flow sensing problem, the desiderata of the sensor model are: accurate angle estimation (e.g., <5° average error), accurate velocity estimation (e.g., <0.2 m/s average error), and compatibility with high-frequency operation.

TABLE 1

Test error of each MAST-Filter pair for angle [top row, °] and magnitude [bottom row, m/s] prediction, with empirical 95%-confidence upper bounds on the error in parentheses. Extending the filter length (left to right) weakly improves performance in wind prediction by reducing noise in the data. Increasing the number of sensors is a more beneficial change for estimating wind angle and speed (seen top to bottom).

| MAST | | Filter | | |
|---|---|---|---|---|
| | | N = 1 | N = 2 | N = 5 |
| Triangle | (°) | 13.9 (51.4) | 13.1 (47.8) | 12.1 (44.1) |
| | (m/s) | 0.26 (0.85) | 0.27 (0.87) | 0.27 (0.79) |
| Square | (°) | 5.3 (18.2) | 5.8 (20.1) | 4.8 (16.5) |
| | (m/s) | 0.16 (0.41) | 0.16 (0.41) | 0.15 (0.40) |
| Pentagon | (°) | 1.6 (5.0) | 1.8 (5.2) | 1.5 (5.2) |
| | (m/s) | 0.14 (0.36) | 0.15 (0.38) | 0.19 (0.58) |
| Hexagon | (°) | 2.0 (6.1) | 2.1 (6.1) | 1.6 (5.0) |
| | (m/s) | 0.11 (0.30) | 0.12 (0.30) | 0.11 (0.30) |

For each of the twelve MAST-Filter pairs in Table 1, separate wind angle and wind magnitude predictors were trained. The networks were separated for interpretability considerations and to account for the differing complexity of the angle and magnitude prediction problems. The filtering was a pure averaging of N consecutive readings. As such, for any N, the "effective" sensor model operating frequency is 1000/N Hz; N=1 corresponds to no filtering, while N=5 averages five consecutive readings and only allows the sensor model to operate at 200 Hz. More sophisticated filtering techniques like moving averages (or general finite impulse response (FIR) filters) were not considered here as they introduce correlations in the data, which violates the assumption of data independence for the learning problem. However, it is recognized that such techniques could improve the sensor performance, and it is envisioned such could be incorporated readily.

The training, test, and validation datasets used for the sensor model were sampled at random from subintervals of raw data, utilizing a 15 ms gap between the beginning of each sample to reduce the presence of correlations due to possible transient flow effects. Concretely, for no filtering, every fifteenth data point was selected, whereas for N=5, five data points were sampled and averaged, then ten data points were skipped, then the next set of five points were sampled. Thus, the beginning of each sample maintained a distance of fifteen samples, equivalent to 15 ms.

Wind Angle Prediction. For the wind angle estimation problem, the network layer widths were linear in the number of active sensors; this scaling was intended to allow each network approximately equal expressivity in order to ensure a fair comparison.

For the wind angle prediction problem, a densely connected network with two hidden layers and ReLU nonlinearity was used for each MAST-filter pair. The input size for each MAST geometry was equal to the number of sensors. For an input layer of width $n_s$ (number of sensors in the MAST geometry), the first hidden layer was of width $8 n_s$, and the second hidden layer was of width $4 n_s + 5$ (the addition of five was designed to help the smaller geometries). The output was a scalar (the predicted angle of the incoming wind). For the wind speed prediction problem, a densely connected network with one hidden layer and fixed input size was used (again with ReLU nonlinearity). The layer widths {input, hidden, output} were {3, 6, 1} for all MAST geometries. These architectures were selected by evaluating their performance on the validation data.

Loss Functions and Training Parameters. The cost function was a modified $L_1$ loss that accounted for the 'wrapping' of the angle prediction (so that, for example, predictions of $2\pi - \epsilon_1$ radians were evaluated as being 'close' to a true label of $\epsilon_2$ radians. Without this wrapping, gradients would become very large and misdirected near the $0/2\pi$ boundary. The benefit of an $L_1$ loss was direct interpretability of the loss function as the mean absolute error. Losses were evaluated in units of m/s and radians for numerical reasons this is particularly beneficial if the angle and speed prediction are unified in one network, to ensure that errors are of the same order of magnitude. Results are converted back to degrees for reported results in the main text. Training for each network was completed using Pytorch on an Nvidia Titan RTX GPU. The Adam optimizer with default parameters was used for every model. The angle prediction performance of each MAST-geometry pair was evaluated over five random seeds (for a total of 12 MAST-filter pairs by 5 seeds, or 60 models to be trained). Total training time for all 60 of these models took (for the 20-30 epochs sufficient for convergence) on the order of a few hours (note that some time was lost due to inefficiencies in requiring a custom loss function). The speed prediction performance required the training of 480 models (the 60 above times 8 different leave-one-out cross-validation options for each wind speed). Total time for speed prediction training was also 3-4 hours (because only 5 epochs per model were needed for convergence due to the data sparseness, and the default $L_1$ loss could be used for this network).

Figure 10:
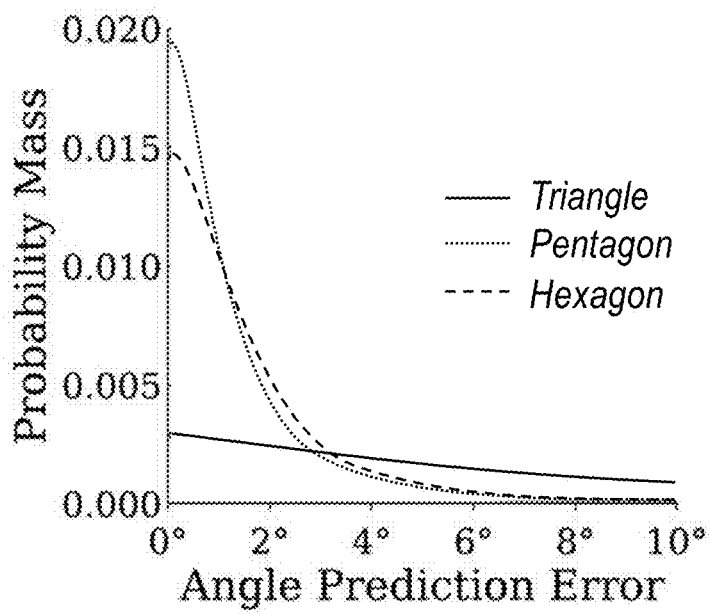
FIGS. 10 and 11 are graphs showing angle (FIG. 10) and speed (FIG. 11) prediction error distributions for hexagon, pentagon, and triangle MAST geometries.

The mean angle prediction error for all geometry-filter pairs is summarized in Table 1. The key result is that hexagon and pentagon MAST geometries both greatly outperform the triangle and square geometries as predicted. Furthermore, with pentagon slightly outperforming hexagon, both achieve ≈2° test error (satisfying the accuracy criterion) in the unfiltered case (satisfying the high-frequency criterion). The empirical angle prediction error distributions for the triangle, pentagon and hexagon geometries are shown in FIG. 10.

Wind Magnitude Prediction. For the wind magnitude (speed) prediction problem, additional care was required because the sensor was only evaluated at eight distinct wind speeds. While the angle prediction data is "dense" throughout the entire domain, the wind magnitude data is "sparse". As such, incautious analysis will underestimate the true prediction error of the learned model by overfitting to the eight particular wind speeds seen in training. To combat this, two techniques were implemented in parallel.

First, the model was simplified by taking as input only the three largest sensor readings for each time step; the inductive bias here is that at most half of the sensors are facing the wind at any given time. For the triangle MAST this procedure utilizes all of the readings, while for the hexagon MAST only half of the readings are used. This allows for a reduction in model size from the angle prediction problem, which discourages overfitting to the sparser data. The second technique utilizes leave-one-out cross-validation (LOOCV) to estimate prediction error on wind speeds unseen during training. This technique incentivizes learning "less complex" models to promote generalization and reduce overfitting.

Figure 11:
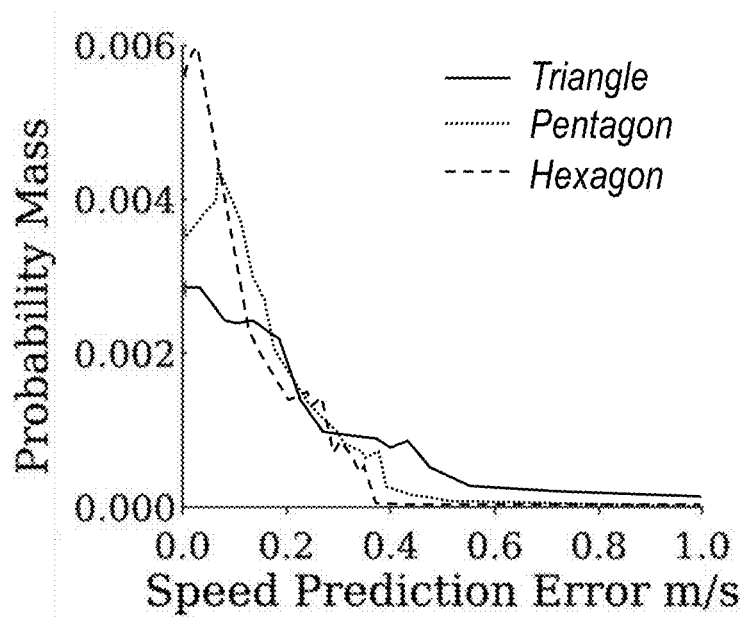

The mean velocity prediction error for all geometry-filter pairs is also summarized in Table 1, and the empirical velocity prediction error distributions for the pentagon and hexagon geometries are shown in FIG. 11, with the triangle geometry included for contrast.

Again, both pentagon and hexagon geometries attain sufficient overall performance to meet the accuracy criterion for the sensor model, while neither square nor triangle configurations are able to satisfy either of the first two criteria. This demonstrated performance in speed and angle estimation supports the use of five or more sensors to provide a high degree of accuracy when estimating a wind vector.

Figure 12:
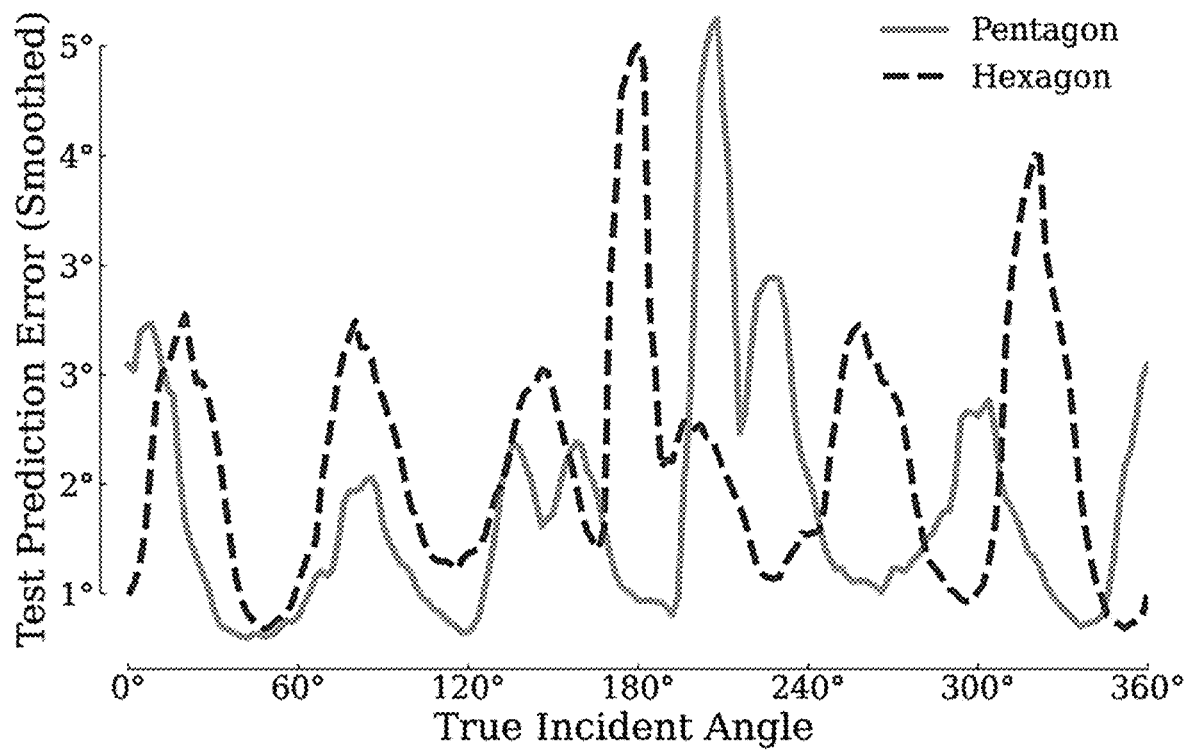
FIG. 12 is a graph showing smoothed mean angle prediction error vs. true incident angle. Note that the pentagon MAST has a peak across zero degrees incidence, giving it only five distinct peaks, whereas hexagon has six peaks, suggesting that observability is geometry-dependent.

Comparing Pentagon and Hexagon Geometries. To investigate the dependence of angle prediction error upon the true incident wind angle, FIG. 12 shows the smoothed mean errors in angle prediction for pentagon and hexagon configurations as a function of true incident angle. The smoothing function is a simple moving average with a centered window of length seven.

Note that both hexagon and pentagon MAST configurations have "low-observability" regions where mean errors are larger; interestingly, the number of peaks is equal to the number of sensors, suggesting a cyclic reduction in observability intrinsic to the underlying MAST geometry. Given the similar performance of the pentagon and hexagon configurations—both deemed sufficiently accurate—the pentagon configuration is deemed the 'minimal' configuration for a high degree of accuracy on a UAV, using the fewest sensors to achieve the requisite performance. It is notable, and perhaps unintuitive, that the pentagon MAST should outperform the hexagon MAST in angle prediction. However, the sensor models derived here are not shown to be optimal, but merely sufficient to meet desired criteria. With this particular framework, a designer may choose to use the hexagon or pentagon configurations depending on whether greater accuracy in wind speed or wind direction is desired. It is expected that the optimal hexagon sensor model should have the capacity to outperform the optimal pentagon sensor model.

Example 2

Figure 13:
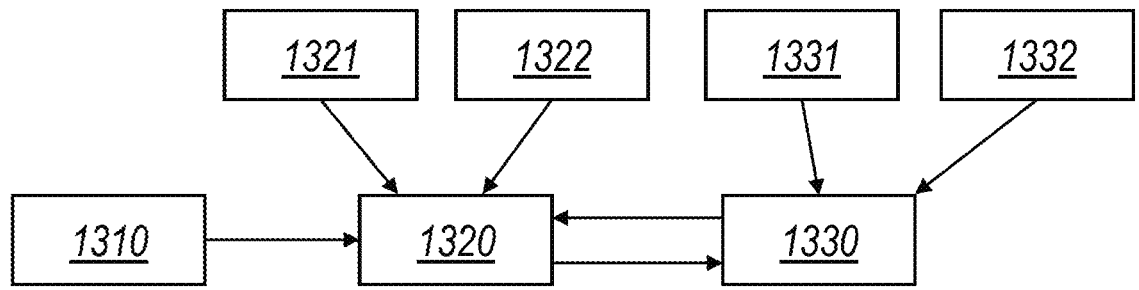
FIG. 13 is a block diagram of an overview of a system including the sensing and computing components, and communication among them.

The basic FlowDrone architecture and main components of this example are illustrated in the block diagram of FIG. 13. There, a MAST Sensor 1310 sends readings to a Raspberry Pi 4 & MCC118 DAQ HAT 1320. The Raspberry Pi has a sensor model 1321 and residual policy 1322. Control input is sent to a Pixhawk 4 Autopilot 1330, which also receives information from a compass 1331 and optical flow 1332. The Autopilot also sends back a state estimate to the Raspberry Pi. Communication to/from the Autopilot is done using ROS2.

More specifically, the FlowDrone platform is built on top of the Holybro X500 Kit with a Pixhawk 4 autopilot. The drone is equipped with an accelerometer and magnetometer, as well as an onboard Holybro M8N GPS for compass readings (the primary yaw reference), and a PX4FLOW Smart Camera and LIDAR-Lite v3 for optical flow and height measurements. The GPS is not used for these examples, as the flights were conducted indoors. These sensors are used by the Pixhawk to calculate state estimates, which are then passed to an onboard companion computer (a Raspberry Pi 4 8 GB Model B) over the PX4-ROS2 bridge at 100 Hz. All sensing and computation is onboard, thus allowing for future outdoor deployment.

A feature of the FlowDrone is the use of MEMS flow sensor technology disclosed herein for airflow sensing. Multiple hot-wires are integrated in the MAST (MEMS anemometry sensing tower) to enable omnidirectional flow sensing (in one example, a pentagonal arrangement was used).

The sensors were attached to vertical printed circuit boards (PCBs). These PCBs project the MEMS hot-wires sufficiently above the rotor plane (150 mm) to measure the free-stream velocity. The PCBs are arranged in a pentagonal geometry, which provides sufficient coverage to accurately measure a two-dimensional wind vector. The MAST performance was validated through wind tunnel testing at velocities between 1.3-5.0 m/s and orientations between 0° and 360°.

Raw sensor readings (in the form of voltages) are transmitted to the Raspberry Pi at 1 KHz using an MCC118 DAQ HAT. These raw measurements are then processed by a neural network (that runs on the Raspberry Pi) to compute an estimate of the wind magnitude and direction.

A sensor model running on board the Raspberry Pi estimates the wind vector (direction and magnitude) from raw sensor readings. Due to the nonlinearity of the sensor, a neural network was trained to approximate the sensor-to-wind mapping from wind tunnel data. Separate networks were developed for wind direction and wind magnitude predictions.

The angle prediction network is a fully connected network with two hidden layers using a ReLU activation, while the speed prediction network is fully connected with one hidden layer, utilizing a Tanh activation. The MAST achieves the following performance in testing: ~ 2° expected prediction error (with an empirical 95% error upper bound of 5°), and 0.14 m/s expected prediction error (with an empirical 95% error upper bound of 0.36 m/s). This performance compares favorably to existing UAV flow-sensing methods. For example, conventional differential pressure probe techniques achieve 15% full-scale deflection and 12° mean errors, respectively. Another conventional approach achieves root mean square error of 0.38 m/s in velocity prediction, but without description of temporal resolution. Finally, another conventional approach achieves 1 m/s and 5° error at 400 Hz bandwidth, at the expense of requiring a large, bulky sensor. Thus, the low-weight MAST and associated sensor model provide low-latency wind estimates to the control architecture that are as accurate as any existing method implementable on UAVs.

Wind-aware control. The wind estimate and the drone's state estimate are utilized by a wind-aware controller trained via reinforcement learning (RL) in simulation (with physical parameters estimated via system identification, and typical gust profiles measured experimentally).

The controller architecture and training process is described below. This controller operates at 40 Hz, publishing body rate and thrust setpoints to the Pixhawk 4. The Pixhawk 4 then executes rate control and mixing, before outputting actuator outputs to a power module, which distributes power and PWM signals to each motor.

Wind-Aware Control.
Simulated Environment with Wind.

Since it is challenging and time-consuming to perform hardware-in-the-loop training of a controller in diverse wind conditions in a real lab setup, the policy is trained in a simulated environment built upon gym-pybullet-drones, an open-source drone simulation environment based on the PyBullet simulator. The lift force generated by the rotors is calculated based on thrust calibration results on the real drone. Physical parameters including mass and moment of inertia obtained via system identification are used, and the physics engine is relied upon for dynamics simulation. The effect of wind is simulated using the model from Craig, W., et al., "Geometric attitude and position control of a quadrotor in wind," *Journal of Guidance, Control, and Dynamics*, vol. 43, no. 5, pp. 870-883, 2020, which relates the wind speed and direction to the bluff-body and induced drag acting on the drone. The drag forces are then manually added in simulation at each timestep given the drone state. The simulated wind is generated in the positive X direction in the world frame. The wind speed is varied in a step-like profile (mimicking the measurements taken in real wind conditions as in FIG. 17), which consists of three stages: "Low", "Slope", and "High". The wind speed and duration of the three stages are all randomized for training a robust wind-aware policy. An additional dip of the wind speed is added to the "High" stage to mimic sudden instability, which was frequently observed during real flights as the flow generated by the fan array is unsteady and not spatially uniform.

Residual Policy for Wind Compensation.

Figure 14:
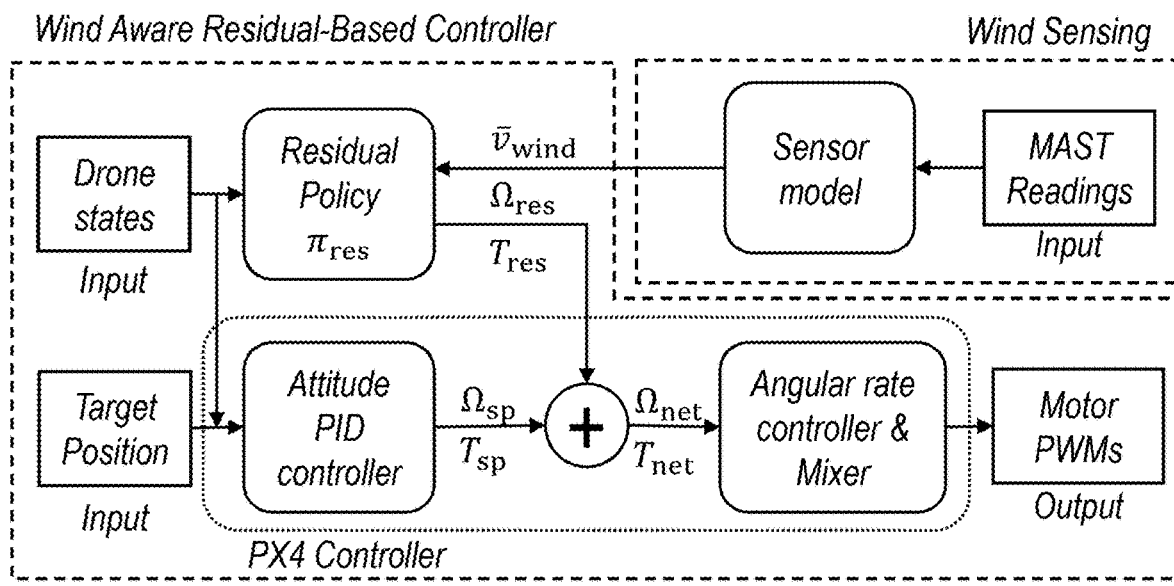
FIG. 14 is a diagram showing the wind sensing and the wind-aware residual-based controller; taking MAST voltage readings and drone states as input, the controller computes motor PWM commands compensating for wind disturbances.

In order to perform wind compensation, a residual control policy is trained on top of the open-source PX4 attitude controller (see FIG. 14 for a visualization of the overall controller architecture). Using a reinforcement learning approach (instead of a model-based approach) provides the ability to train a nonlinear policy which can potentially leverage temporal structure in wind gusts. The trained residual policy takes real-time wind estimates and drone states as input and outputs additional body angular rates $\Omega_{res}$ and thrust $T_{res}$, which are then added to the respective setpoints $\Omega_{sp}$, $T_{sp}$ calculated by the upstream PX4 attitude PID controller. The net setpoints $\Omega_{net}$, $T_{net}$ are then fed into the downstream angular rate controller and mixer:

$$\Omega_{net} = \Omega_{sp} + \Omega_{res}. \quad (1)$$

$$T_{net} = T_{sp} + T_{res}. \quad (2)$$

The overall controller runs at 40 Hz. The residual policy πres is parameterized as a multi-layer perceptron (MLP) with hidden layer sizes [512, 256, 128, 128] and ReLU activation. The input to the residual policy $$[\Omega_{res}, T_{res}] = \pi_{res}(r, \Psi, v, w, \bar{v}_{wind}) \quad (3)$$

includes the drone's current 3D position ($r=[x, y, z]$), orientation in roll, pitch, and yaw ($\Psi=[\phi, \theta, \psi]$), linear velocity ($v=\dot{r}$), and angular velocity ($w=[w_x, w_y, w_z]$), all relative to the world frame. In addition, the residual policy takes as input the wind measurement at the current timestep t and past four timesteps (only the components in the X direction of the world frame). In this example, the system skips $t_s=5$ steps between each wind measurement ($\bar{v}_{wind}=[v_{wind}^t, v_{wind}^{t-t_s}, v_{wind}^{t-2t_s}, v_{wind}^{t-3t_s}, v_{wind}^{t-4t_s}]$). Since the control loop is 40 Hz, this roughly covers a time window of 0.5 s. The outputs, $\Omega_{res}$ and $T_{res}$, are normalized between [−0.3, 0.3 rad/s] and [−1, 1N] respectively using the Tanh activation function.

On the real hardware platform, the wind measurements are obtained by processing the MAST readings through the sensor model described above. In simulation, the wind sensor model is treated as perfect, meaning the wind measurement is the same as the simulated wind. Since the wind profile contains a non-trivial amount of noise, the measurements are filtered using a rolling maximum over the past 0.1 s both in simulation and hardware. It was found that large values of body rate setpoints $\Omega_{sp}$ from the attitude controller can hinder the training progress of the residual policy. Thus, $\Omega_{sp}$ is clipped to be in [−0.1, 0.1 rad/s] for the wind-aware controller.

Reinforcement Learning Training.

The residual policy is trained in simulation using Soft Actor Critic, an off-policy reinforcement learning algorithm. The task of the drone is to hover at the target position (0, 0, 1 m) in a 10-second horizon (thus 400 timesteps using 40 Hz control rate). The reward function is defined as the negative of the distance of the current drone position to the target. The initial position and orientation of the drone are randomized at each rollout; the ranges of the initial 3D positions, roll and pitch angles, and yaw angle are [−30, 30 cm], [−0.1, 0.1 rad], and [−0.3, 0.3 rad]. The model is trained with 10 million total simulation timesteps. It is updated every 2000 timesteps for 200 gradient steps with a batch size of 128 and learning rate of 1e-4. The replay buffer contains a maximum of 1 million steps.

In order to demonstrate the effectiveness of MEMS hotwire sensors for UAV control, the wind-aware controller's performance in tracking a hover setpoint in the presence of a wind gust (same task as in simulation) was evaluated in a real setting. The following three controllers were used:

(1) Wind-Aware Residual-Based Controller ("windaware"). This is the controller as described previously in this example.
(2) Wind-Unaware Residual-Based Controller ("windunaware"). This controller has the same architecture and is trained with the same conditions as wind-aware, except that the residual policy does not have access to the wind estimate $\bar{v}_{wind}$. Differences in performance between this controller and the wind-aware controller thus directly provide evidence for the benefits of utilizing wind measurements for control.
(3) PX4 Attitude Controller ("baseline"). The popular open-source PX4 Autopilot for attitude control was used, publishing body rate and thrust setpoints to the PX4 at 40 Hz over ROS2. To integrate with the learning framework, the attitude controller has been adapted into Python. Referencing FIG. 14, this controller is the "PX4 controller" at the bottom half without wind sensing or residual policy. Unlike wind-aware and wind-unaware, the body rate setpoint $\Omega_{sp}$ is not clipped here.

Experiment Setup.

10 flights were conducted for each of the three controllers in controlled gust conditions. Six high velocity (350 cfm) blowers were used to generate the gusts during hardware evaluation. The blowers were arranged in a 2×3 array, with the top row blowers inverted, generating a flow volume of 22×86 cm at the blower exit. By the time the flow volume reaches the drone, positioned 4 m away from the blower outlets, the flow volume encompasses the entire drone for the duration of the flight test. The peak gust speed was approximately 5 m/s (verified by a handheld anemometer) for all experiments. It should be noted that gaps between the fans and turbulence resulted in a spatiotemporally-varying flow.

For each test, the drone was commanded to take off and hover at $r_{sp}$=[0, 0, 1]m, $\Psi_{sp}$=[0, 0, 0]rad, in an inertial East-North-Up frame. This remains the setpoint for the duration of the flight. Once in position, the drone switches to the desired controller: baseline, wind-unaware, or windaware. From t=[0, 12) sec, the drone continues to hover with zero wind. This delay (which was not simulated during training) is used to ensure that the residual policy has not learned an open-loop prediction of when the gust will start. At t=12 sec, the fans are turned on to their maximum setting for the remaining 18 sec of flight (T=30 sec total). The fans are oriented to blow in the +X (or East) direction of the inertial frame, which at ψ=0 is at the back of the drone, matching simulation conditions.

Figure 15:
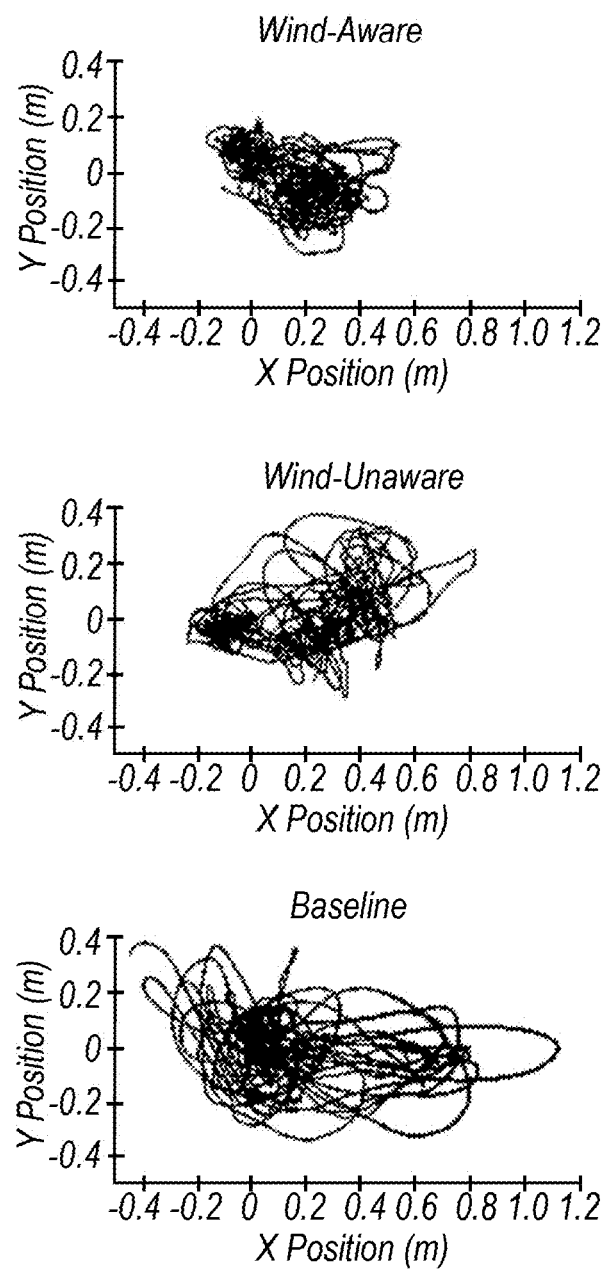
FIG. 15 is a series of graphs showing X and Y trajectories of all ten trials for each of the three controllers (wind-aware, wind-unaware, and baseline) while attempting to maintain a hover position throughout a 0-5 m/s gust in the +X direction. The wind-aware controller outperforms the two baselines. Here, performance is measured as the ability to reduce both maximum and overall error in the presence of wind.
Figure 16:
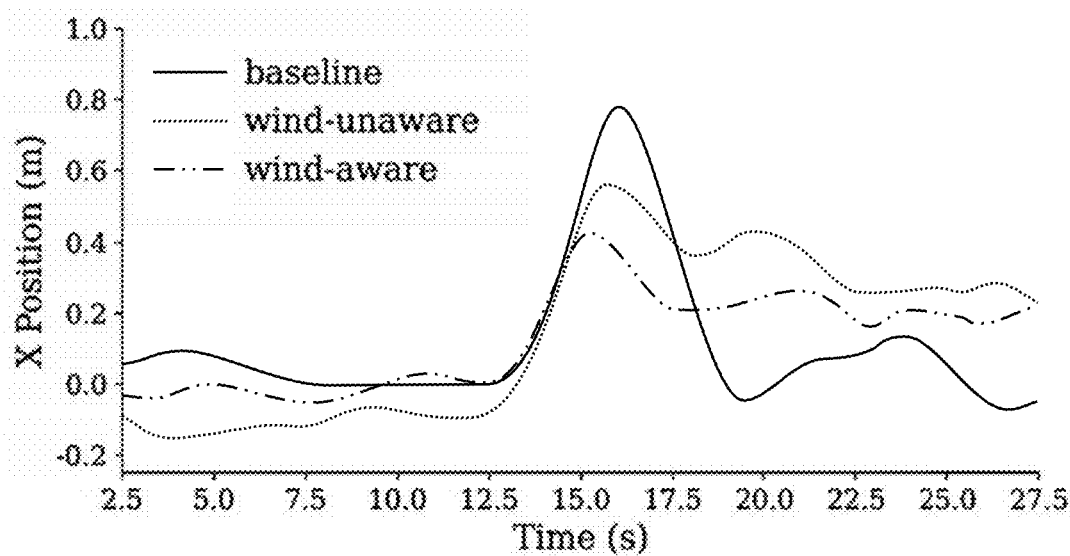
FIG. 16 is a graph showing average X trajectory for each controller over ten runs. Trajectories were shifted (within ±0.75 s) to align the gust onset.
Figure 17:
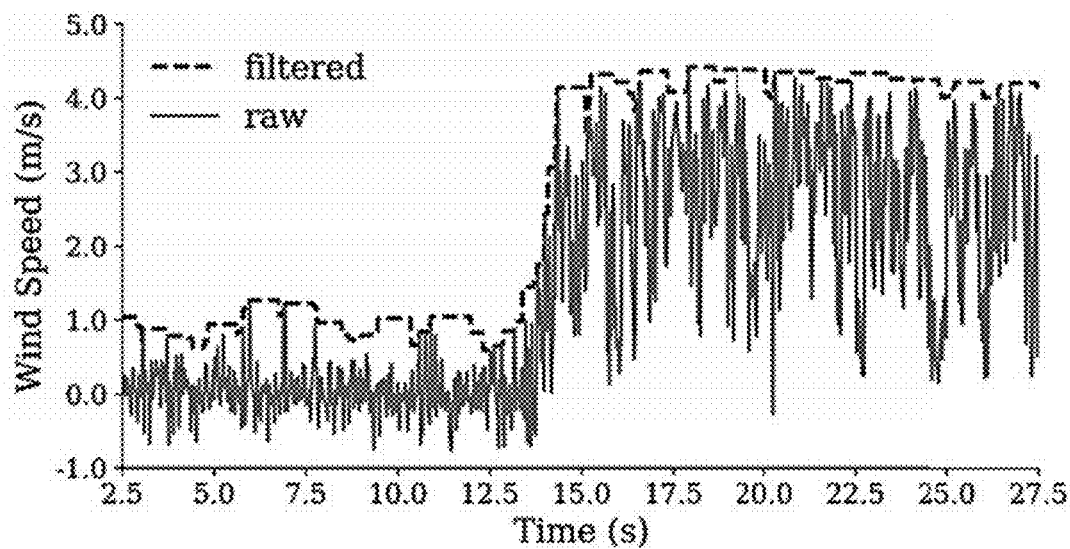
FIG. 17 is a graph showing raw and filtered wind estimates for a representative gust measured during a wind-aware flight. The filter effectively reduces high-frequency noise in the flow and captures the gust onset.

The 10 trajectories for each controller are plotted in FIG. 15. Qualitatively, the wind-aware trajectory is more concentrated, with visibly less maximum error and variance in both X and Y. In FIG. 16, the average X-trajectory of each controller is plotted against time, and standard deviations are determined (for clarity, the standard deviation bands are not shown on the plot). Again, the wind-aware controller deviates the least from the setpoint. It was observed that the average baseline trajectory returns to x=0 faster than both residual-based controllers. Without being held to any one theory, one hypothesis is that extending the simulation episode length beyond 10 seconds (where the gust duration was 4-6 seconds), will improve performance in hardware (where the episode length is 30 seconds, and the gust duration is 15 seconds). In FIG. 17, a representative gust measured during a wind-aware flight is seen. The raw wind estimate is shown, as well as the output of a moving maximum filter applied over the last 100 wind estimates (0.1 seconds), which represents the estimate provided to the residual policy.

The performance of each controller is evaluated by three metrics on the X trajectory: maximum error (or deviation from the hover setpoint), mean-squared error (over the entire trajectory), and total range (the difference between the maximum and minimum) across the trajectory. The results are shown in Table 2, below.

TABLE 2

Hardware performance of each controller along several metrics, with the standard deviation in parentheses. The minimum entry of each row represents the best performance and is denoted by boldface font.

| | Wind-Aware | Wind-Unaware | Baseline |
|---|---|---|---|
| Max Error (m) | 0.441 (0.064) | 0.582 (0.094) | 0.780 (0.142) |
| MSE (m$^2$) | 0.035 (0.006) | 0.079 (0.013) | 0.057 (0.016) |
| Range (m) | 0.538 (0.072) | 0.773 (0.100) | 0.962 (0.222) |

Max error most directly penalizes the gust onset effect, while mean squared error (MSE) is taken over the entire trajectory. The range metric additionally penalizes under- or over-shoot. By each metric, the windaware controller outperforms the others; this illustrates the wind-aware controller's ability to reduce both maximal and overall error in the presence of wind. Specifically, in terms of the maximum error metric, the wind-aware controller performance improves (on average over the 10 runs) by 44% over the baseline controller and by 24% over the windunaware controller.

Example 3

Figure 18:
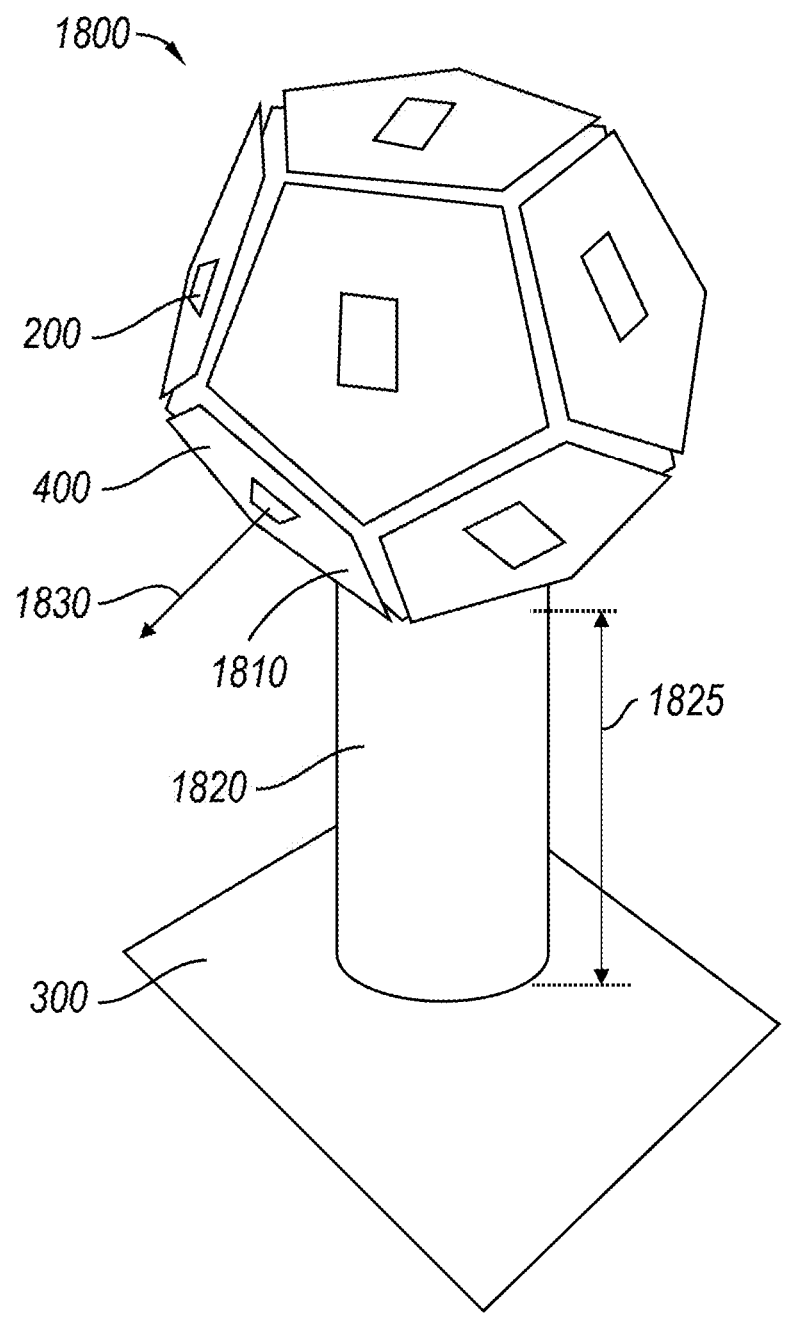
FIG. 18 is an illustration of a system with support substrates arranged in a polyhedron.

The previous examples are focused on 2D (in-plane) sensing. However, 3D sensing can readily be achieved. Referring to FIG. 18, a system 1800 is shown with the support substrates 400 arranged to form a polyhedron (here, a dodecahedron). In this configuration, there are n external faces 1810 of a polyhedron, and there are n−1 MEMS flow sensors 200. One face is used to couple a spacer 1820 to the polyhedron. The spacer positions the polyhedron a fixed distance 1830 from the chassis substrate 300. As disclosed for other embodiments, each face with a flow sensor operably coupled to it may contain an amplifying circuit. As disclosed for other embodiments, the chassis substrate may provide power and read signals.

Each external face may be configured to face in a different direction. For example, the polyhedron may preferably be arranged such that each line 1830 normal to each external face 1810, extending from each MEMS sensor, will not intersect any other normal line from any other external face.

As seen in the above examples, the small timescales of MEMS devices are leveraged in a highly robust sensor. In some embodiments, the sensors in the examples may have a 3 dB open-loop bandwidth of 570 Hz as determined by square-wave testing. This is sufficient to temporally resolve most of the aerodynamic phenomena of interest, and the simplicity of the operating circuit makes it a very low cost and lightweight sensor system. If even higher bandwidth is required, operating circuits with feedback can be used.

In the examples, the MAST and its accompanying sensor model (a neural network) were able to estimate a wind vector with an average accuracy 0.14 m/s for speed and 1.6° for direction. The sensor error's empirical 95%-confidence upper bound is 0.36 m/s and 5.0°, respectively. With its high accuracy and bandwidth, this sensor is poised to enhance flow measurement capabilities onboard UAVs.

The MEMS Hotwire sensor disclosed herein provides many of the advantages of hot-wire anemometry—namely, high spatial and temporal resolution—in a small and robust package. However, other kinds of sensors, such as pressure- or strain-based sensors, can also be used as long as they are organized in a way similar to what is disclosed herein. That is, in some embodiments, rather than a hot-wire MEMS sensor, a pressure- or strain-based sensor with similar or improved open-loop bandwidths may be used in the disclosed sensor configurations (e.g., a pentagonal or hexagonal arrangement).

With a measured bandwidth of 570 Hz, the disclosed sensor stands to significantly increase the wind estimation capabilities of UAV platforms through its temporal resolution alone.

In some embodiments, the disclosed pentagon MAST system may strategically place between three and eighteen MEMS flow sensors in the flow to resolve a two-dimensional wind vector (direction and magnitude). A hexagon MAST system with six MEMS Hotwire sensors was also tested. While both the pentagon and hexagon configurations both perform sufficiently well (the pentagon outperforms slightly in angle prediction, while the hexagon outperforms slightly in speed prediction), the pentagon arrangement is highlighted as it requires fewer MEMS Hotwire sensors. Other polygon shaped configurations are also possible.

Various modifications may be made to the systems, methods, apparatus, mechanisms, techniques and portions thereof described herein with respect to the various figures, such modifications being contemplated as being within the scope of the invention. For example, while a specific order of steps or arrangement of functional elements is presented in the various embodiments described herein, various other orders/arrangements of steps or functional elements may be utilized within the context of the various embodiments. Further, while modifications to embodiments may be discussed individually, various embodiments may use multiple modifications contemporaneously or in sequence, compound modifications and the like.

Although various embodiments which incorporate the teachings of the present invention have been shown and described in detail herein, those skilled in the art can readily devise many other varied embodiments that still incorporate these teachings. Thus, while the foregoing is directed to various embodiments of the present invention, other and further embodiments of the invention may be devised without departing from the basic scope thereof. As such, the appropriate scope of the invention is to be determined according to the claims.

What is claimed:

1. An omnidirectional flow sensor, comprising:
a plurality of microelectromechanical system (MEMS) flow sensors, each MEMS flow sensor comprising:
a substrate having a first surface and a second surface opposite the first surface, and a window extending through a portion of the first surface to the second surface; and
at least one wire array disposed on the first surface, each wire array comprising an odd number of wires aligned in parallel directions and connected in series, one wire array of the at least one wire array disposed at least partially over the window;
a chassis substrate, upon which an additional MEMS flow sensor is placed;
a plurality of support substrates;
wherein each MEMS flow sensor of the plurality of MEMS flow sensors is coupled to a respective support substrate of the plurality of support substrates at a fixed distance from the chassis substrate; and
wherein each MEMS flow sensor faces a different direction.

2. The omnidirectional flow sensor of claim 1, further comprising at least one spacer configured to be coupled between the chassis substrate and the plurality of support substrates.

3. The omnidirectional flow sensor of claim 2, the plurality of support substrates are arranged in a three-dimensional geometric shape, the three-dimensional geometric shape being disposed at an end of the at least one spacer.

4. The omnidirectional flow sensor of claim 1, further comprising an instrument amplifier on each support substrate of the plurality of support substrates configured to amplify a signal from each MEMS flow sensor for greater resolution.

5. The omnidirectional flow sensor of claim 1, wherein each support substrate of the plurality of support substrates is coupled orthogonal to the chassis substrate, and each support substrate has one of the plurality of MEMS flow sensors placed on the support substrate at a fixed distance from the chassis substrate facing away from other support substrates.

6. The omnidirectional flow sensor of claim 1, wherein there are at least 5 support substrates of the plurality of support substrates.

7. The omnidirectional flow sensor of claim 1, wherein each of the plurality of MEMS flow sensors operates as a hotwire anemometer.

8. The omnidirectional flow sensor of claim 1, wherein the at least one wire array is part of a Wheatstone bridge.

9. The omnidirectional flow sensor of claim 1, wherein the at least one wire array includes four wire arrays configured as legs of a Wheatstone bridge, the four wire arrays including:
a first wire array on the first surface couples a first contact and a second contact;
a second wire array on the first surface couples the second contact and a third contact;
a third wire array on the first surface couples the third contact and a fourth contact; and
a fourth wire array configured to extend over the window couples the fourth contact and the first contact.

10. The omnidirectional flow sensor of claim 9, wherein the substrate is a silicon substrate electrically insulated with a layer of silicon nitride or silicon oxide.

11. The omnidirectional flow sensor of claim 10, wherein each contact comprises platinum.

12. The omnidirectional flow sensor of claim 11, wherein each wire array comprises platinum.

13. The omnidirectional flow sensor of claim 12, wherein the chassis substrate and each support substrate of the plurality of support substrates comprises a printed circuit board (PCB).

14. The omnidirectional flow sensor of claim 1, further comprising an instrument amplifier on each support substrate of the plurality of support substrates configured to amplify a signal from each MEMS flow sensor for greater resolution.

15. The omnidirectional flow sensor of claim 1, further comprising a constant voltage source on the chassis substrate that is operably coupled to each MEMS flow sensor.

16. The omnidirectional flow sensor of claim 1, wherein each support substrate of the plurality of support substrates has one MEMS flow sensor bonded to the support substrate with a conductive epoxy.

17. The omnidirectional flow sensor of claim 1, wherein each support substrate of the plurality of support substrates has one MEMS flow sensor bonded to the support substrate with solder.

18. The omnidirectional flow sensor of claim 1, wherein each support substrate of the plurality of support substrates has one MEMS flow sensor bonded to the support substrate with gold.

19. A system, comprising:
at least one processor; and
an omnidirectional flow sensor operably coupled to the at least one processor, the omnidirectional flow sensor comprising:
   a plurality of microelectromechanical system (MEMS) flow sensors, each MEMS flow sensor comprising:
      a substrate having a first surface and a second surface opposite the first surface, and a window extending through a portion of the first surface to the second surface; and
      at least one wire array disposed on the first surface, each wire array comprising an odd number of wires aligned in parallel directions and connected in series, one wire array of the at least one wire array disposed at least partially over the window;
   a chassis substrate, upon which an additional MEMS flow sensor is placed; and
   a plurality of support substrates;
   wherein each MEMS flow sensor of the plurality of MEMS flow sensors is coupled to a respective support substrate of the plurality of supports substrates at a fixed distance from the chassis substrate; and
   wherein each MEMS flow sensor faces a different direction.

20. The system of claim 19, further comprising a vehicle, wherein the omnidirectional flow sensor is operably coupled to the vehicle.

21. The system of claim 20, wherein the vehicle is an unmanned aerial vehicle (UAV).

22. The system of claim 19, wherein the at least one processor is coupled to a non-transitory computer-readable storage device containing instructions that, when executed by the at least one processor, causes the at least one processor to, collectively:
cause a constant voltage to be applied across a Wheatstone bridge of the omnidirectional flow sensor;
receive signals from each MEMS flow sensor in the omnidirectional flow sensor;
determine a wind angle by passing the received signals to a first trained machine learning algorithm and/or determining a wind magnitude by passing the received signals to a second trained machine learning algorithm; and
output the determined wind angle and/or wind magnitude.

23. The system of claim 22, wherein the first trained machine learning algorithm comprises an input layer and two hidden layers, the two hidden layers including a first hidden layer and a second hidden layer, the input layer having a width of n, where n is a number of MEMS flow sensor in the system, the first hidden layer being of width 8n, and the second hidden layer being of width 4n+5.

24. The system of claim 23, wherein the second trained machine learning algorithm comprises an input layer, a hidden layer, and an output layer, the input layer having a width of 3, the hidden layer having a width of 6, and the output layer having a width of 1.

* * * * *